United States Patent [19]

Vance et al.

[11] 4,271,501
[45] Jun. 2, 1981

[54] SPLITTER/COMBINER NETWORK

[75] Inventors: Ian A. W. Vance, Newport; Michael R. Overy, Alton, both of England

[73] Assignee: International Standard Electric Corporation, New York, N.Y.

[21] Appl. No.: 88,744

[22] Filed: Oct. 26, 1979

[30] Foreign Application Priority Data

Nov. 14, 1978 [GB] United Kingdom ............... 44368/78

[51] Int. Cl.³ .......................... H04B 7/24; H04J 15/00
[52] U.S. Cl. ......................................... 370/24; 370/38; 455/86
[58] Field of Search ............... 370/24, 32, 38; 455/86; 179/1 GS

[56] References Cited

U.S. PATENT DOCUMENTS

| | | | |
|---|---|---|---|
| 3,815,137 | 6/1974 | Kaegebein | 370/38 |
| 4,134,068 | 1/1979 | Richardson | 370/24 |

FOREIGN PATENT DOCUMENTS 1556087 11/1979 United Kingdom ...................... 370/24

*Primary Examiner*—Douglas W. Olms
*Attorney, Agent, or Firm*—James B. Raden; William J. Michals

[57] ABSTRACT

A dual splitter/combiner network for a single channel duplex radio transmitter/receiver has a length of transmission line ⅛ wavelength electrical length at the carrier frequency with a diode detector connected thereto at each end. A local oscillator, which is frequency modulated in the transmit mode, is connector to one end of the transmission line and an antenna to the other end. Signals from the antenna, in the receive mode, mix with the oscillator output and the difference frequency output signals at each detector will be in quadrature, suitable for subsequent processing in a direct conversion (zero I.F.) receiver circuit. In the transmit mode the frequency modulated local oscillator signal is transmitted from the antenna.

2 Claims, 1 Drawing Figure

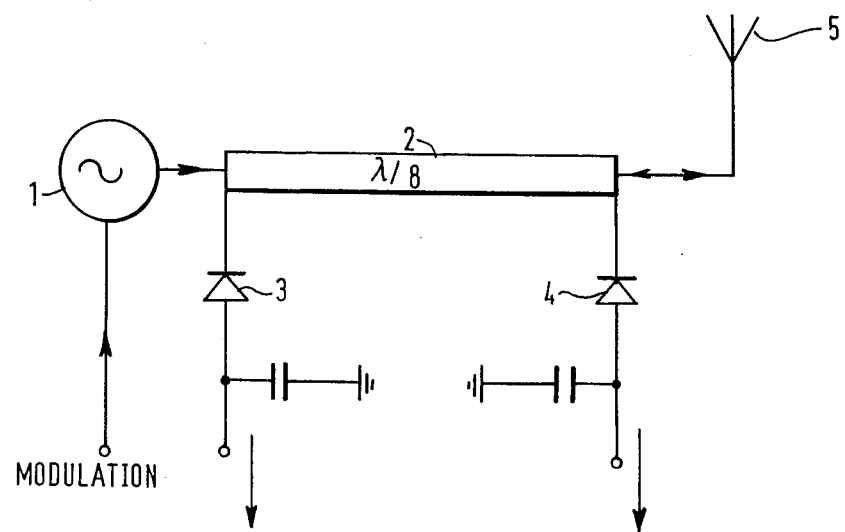
MODULATION

SPLITTER/COMBINER NETWORK

BACKGROUND OF THE INVENTION

This invention relates to splitter/combiner networks having directional properties used in electronic equipment such as radio transmitter/receivers.

The splitter/combiner in accordance with the present invention is particularly suitable for use with a transmitter/receiver arrangement for a single channel duplex radio system in which the local oscillator of a direct conversion (zero I.F.) receiver is modulated by an audio signal to be transmitted, with a dual splitting/combining network having directional properties to effect the duplex operation. Means are also provided in the receiver for removing the transmit audio signal from the receiver output.

SUMMARY OF THE INVENTION

According to the present invention there is provided a splitter/combiner network for connection between a source of frequency modulated carrier wave signals and an antenna, the network comprising a length of transmission line having a pair of similar diode detectors connected thereto one at each end and with the same polarity with respect to the line the electrical length of which is one eighth of a wavelength at the carrier frequency.

BRIEF DESCRIPTION OF THE DRAWING

An embodiment of the invention will now be described with reference to the accompanying drawing in which the single FIGURE illustrates a dual splitter/combiner network with directional properties.

DETAILED DESCRIPTION

A length of transmission line 2, e.g. coaxial cable, is connected between the local r.f. oscillator 1 and the antenna 5 of a direct conversion (zero I.F.) radio receiver. The local oscillator 1 is modulated by a source of audio frequency signals 6. At each end of the transmission line there is connected a diode detector 3, 4, both detectors having the same polarity with respect to the transmission line 2. The electrical length of the line 2 is one eighth of a wavelength at the carrier frequency.

The modulated signals from the oscillator 1 are propagated through the line 2 to the antenna 5. Signals received from the antenna 5 will mix with the oscillator in the two diode detectors 3, 4. However, if the signals at diode detector 3 are considered as a reference, the local oscillator output at diode detector 4 will have referred a 45° phase shift in one direction, due to the ⅛ wavelength length of the line 2, while the signals received from the antenna at detector will have an effective phase shift of 45° in the opposite direction at that point. The result will be that the signals at the outputs of the detectors at, for example, the difference frequency will be in quadrature as required by the direct conversion receiver.

What has been taught, then, is a splitter/combiner network for use with a single channel duplex radio system and facilitating notably a difference frequency output in which the receive signals are in quadrature for subsequent processing in a direct conversion receiver detector circuit.

What is claimed is:

1. A splitter/combiner network for connection between a source of frequency modulated carrier wave signals and an antenna, the network comprising a length of transmission line having a pair of similar diode detectors connected thereto one at each end and with the same polarity with respect to the line the electrical length of which is one eighth of a wavelength at the carrier frequency.

2. A splitter/combiner network according to claim 1, wherein the transmission line is a length of coaxial cable.

* * * * *